US012754108B2

(12) United States Patent
Oremus et al.

(10) Patent No.: US 12,754,108 B2

(45) Date of Patent: Oct. 6, 2026

(54) SYSTEMS AND METHODS FOR ACCURATE LAYER DETECTION AND ANALYSIS IN CHARGED PARTICLE MICROSCOPES

(71) Applicant: FEI Company, Hillsboro, OR (US)

(72) Inventors: Zoltan Oremus, Brno (CZ); Petra Binknerova, Radesinska Svratka (CZ); Hana Sandova, Milicovice (CZ)

(73) Assignee: FEI Company, Hillsboro, OR (US)

( * ) Notice: Subject to any disclaimer, the term of this patent is extended or adjusted under 35 U.S.C. 154(b) by 394 days.

(21) Appl. No.: 18/592,053

(22) Filed: Feb. 29, 2024

(65) Prior Publication Data

US 2024/0295473 A1 Sep. 5, 2024

Related U.S. Application Data

(60) Provisional application No. 63/488,247, filed on Mar. 3, 2023.

(51) Int. Cl.
*G01N 1/28* (2006.01)

(52) U.S. Cl.
CPC .................................. *G01N 1/2813* (2013.01)

(58) Field of Classification Search
CPC ........ G01N 1/2813; G01N 1/32; G01N 21/01; G01N 21/84; G01N 2001/282; G01N 2021/0112; H01J 37/28; H01J 37/3178; H01J 37/222; H01J 37/265
See application file for complete search history.

(56) References Cited

U.S. PATENT DOCUMENTS

| | | | | |
|---|---|---|---|---|
| 7,113,567 B2 * | 9/2006 | Michaelsen | G02B 5/0891 378/85 |
| 7,423,263 B2 * | 9/2008 | Hong | G01N 1/32 250/311 |
| 8,455,821 B2 * | 6/2013 | Arjavac | G01N 1/32 250/311 |
| 9,111,720 B2 * | 8/2015 | Kelley | G01N 1/286 |

(Continued)

FOREIGN PATENT DOCUMENTS

| | | | | |
|---|---|---|---|---|
| JP | 2012252004 A * | 12/2012 | H10P 14/6516 |
| WO | WO-2022223229 A1 | 10/2022 | |

OTHER PUBLICATIONS

Jisu Ryu et al., Automated Cell Layer Counting and Marking at Target layer of 3D NAND TEM samples by Focused Ion Beam, pp. 347-351, Oct. 31-Nov. 4, 2021, ISTFA 2021: Proceedings from the 47th International Symposium for Testing and Failure Analysis, Phoenix Convention Center, Phoenix, Arizona, USA. Available at https://doi.org/10.31399/asm.cp.istfa2021p0347.†

(Continued)

*Primary Examiner* — David A Vanore

(57) ABSTRACT

Embodiments of the present disclosure enable identification, labeling, and isolation of a specific layer within a complex, three-dimensional structure such as a semiconductor memory structure. In particular, the systems and methods described herein can identify a specific layer such as a wordline in a multi-layer structure having periodic or repeated layers for subsequent isolation and analysis. The present disclosure enables automation of layer counting and marking within the multi-layer structure such that a specific desired layer within the multi-layer structure can be isolated and analyzed.

20 Claims, 12 Drawing Sheets

(56) References Cited

U.S. PATENT DOCUMENTS

| | | | | |
|---|---|---|---|---|
| 9,488,554 | B2 | 11/2016 | Schmidt et al. | |
| 10,096,449 | B2 * | 10/2018 | Man | H01J 37/3053 |
| 11,264,200 | B1 | 3/2022 | Onderli{Hacek et al. | |
| 11,355,313 | B2 | 6/2022 | Routh, Jr. et al. | |
| 2004/0185586 | A1 * | 9/2004 | Yasutake | G01N 1/32 850/16 |
| 2006/0163497 | A1 * | 7/2006 | Kodama | G01N 1/32 250/492.21 |
| 2007/0057182 | A1 * | 3/2007 | Feuerbaum | H01J 37/3056 250/310 |
| 2007/0158582 | A1 * | 7/2007 | Ward | B82Y 10/00 250/426 |
| 2009/0053395 | A1 * | 2/2009 | Shemesh | G01N 1/32 118/72 |
| 2009/0296073 | A1 * | 12/2009 | Wagganer | G01N 23/2202 356/72 |
| 2011/0031215 | A1 * | 2/2011 | Mantz | H01J 37/244 378/53 |
| 2015/0243478 | A1 * | 8/2015 | Lee | H01J 37/28 204/192.33 |
| 2017/0250055 | A1 * | 8/2017 | Keady | H01J 37/20 |
| 2018/0182676 | A1 * | 6/2018 | Miller | H10P 74/203 |
| 2018/0218878 | A1 * | 8/2018 | Xu | H01J 37/28 |
| 2019/0139735 | A1 * | 5/2019 | Alvis | H01J 37/31 |
| 2022/0223445 | A1 * | 7/2022 | Avishai | H01J 37/28 |
| 2024/0295473 | A1 * | 9/2024 | Oremus | G01N 1/2813 |
| 2025/0060289 | A1 * | 2/2025 | Binknerová | H01J 37/20 |
| 2025/0069958 | A1 * | 2/2025 | Buxbaum | H01J 37/3056 |
| 2025/0174428 | A1 * | 5/2025 | Onderlicka | H01J 37/22 |
| 2025/0290834 | A1 * | 9/2025 | Binknerová | G01N 1/32 |

OTHER PUBLICATIONS

B.C. Matej Horniak, Classification of Semiconductor Layers Chips in a FIB-SEM Microscope,pp. 1-42, Spring 2022, Masaryk University Faculty of Informatics, Brno CZ (https://is.muni.cz/th/j8op0/?lang=en;keywords=info) (Czech version at https://is.muni.cz/th/j8op0).†

* cited by examiner
† cited by third party

SYSTEMS AND METHODS FOR ACCURATE LAYER DETECTION AND ANALYSIS IN CHARGED PARTICLE MICROSCOPES

CROSS-REFERENCE TO RELATED APPLICATIONS

This application claims the benefit of priority to U.S. Provisional Patent Application No. 63/488,247, filed Mar. 3, 2023, the entire contents of the foregoing application being incorporated herein by reference.

FIELD OF THE INVENTION

The invention relates generally to sample preparation, observation, and analysis in charged particle microscopes.

SUMMARY

Provided herein is a method for preparing a planar lamella. The method optionally includes preparing or receiving a portion of a multi-layer structure for imaging and thinning. The method includes obtaining an image of a cross-section of the portion of the multi-layer structure including a selected layer and at least one of a top layer, a junction layer, or a bottom layer. The method includes identifying the selected layer within the image using a layer-counting module. The method includes marking the selected layer. The method includes thinning the portion of the multi-layer structure to remove material other than the selected layer.

Provided herein is a system for preparing a planar lamella. The system includes a scanning electron microscope (SEM) system. The system includes a focused ion beam (FIB) system. The system includes a computer system including a processor and a memory that is configured to control the SEM system and the FIB system. The memory includes a layer-counting module. The memory stores computer-executable instructions that cause the computer to obtain, using the SEM system, an image of a cross-section of a portion of a multi-layer structure including a selected layer and at least one of a top layer, a junction layer, or a bottom layer. The instructions further cause the computer to identify the selected layer within the image using the layer-counting module. The instructions further cause the computer to mark, using the FIB system, the selected layer. The instructions further cause the computer to thin the portion of the multi-layer structure using the FIB system to remove material other than the selected layer.

Provided herein is a non-transitory computer-readable medium including computer executable instructions. When executed by a computer system, the computer-executable instructions cause the computer system and an associated dual beam system to obtain an image of a cross-section of at least a portion of a multi-layer structure including a selected layer and at least one of a top layer, a junction layer, or a bottom layer. The computer-executable instructions also cause the computer system to identify the selected layer within the image using a layer-counting module. The computer-executable instructions also cause the computer system to mark the selected layer. The computer-executable instructions also cause the computer system to thin the portion of the multi-layer structure to remove material other than the selected layer.

BRIEF DESCRIPTION OF THE DRAWINGS

Like reference numerals refer to corresponding parts throughout the several views of the drawings.

DETAILED DESCRIPTION OF EMBODIMENTS

Figure 1:
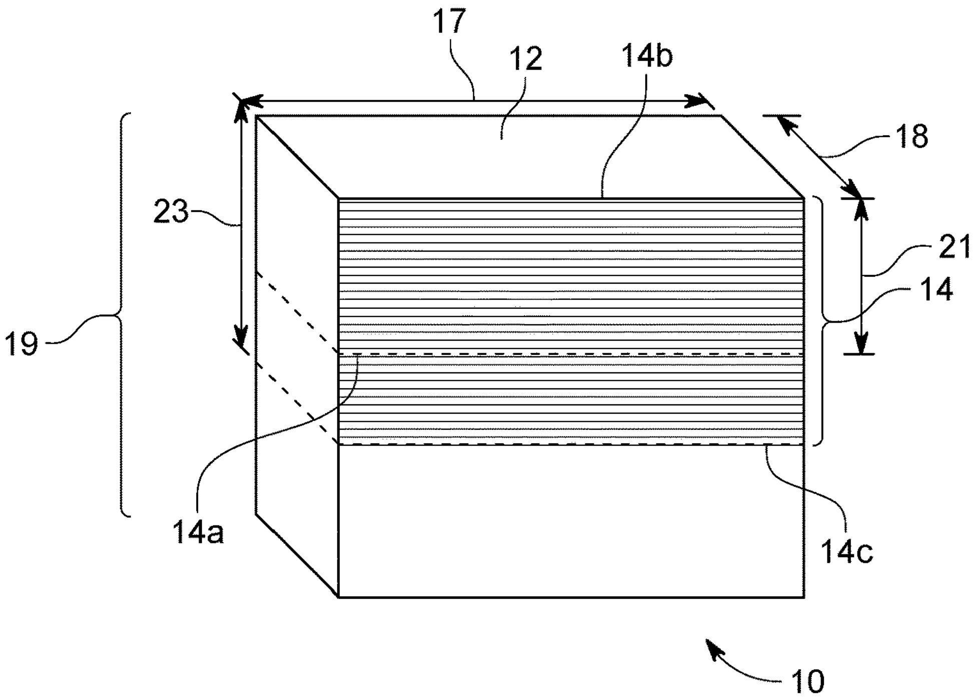
FIG. 1 schematically illustrates a multi-layer structure that is appropriate for analysis using exemplary systems and methods described herein.

Embodiments of the present disclosure enable identification, labeling, and isolation of a specific layer within a complex, three-dimensional structure such as a semiconductor memory structure. In particular, the systems and methods described herein can identify a specific layer such as a wordline in a multi-layer structure having periodic or repeated layers for subsequent isolation and analysis. Conventionally, analysis and isolation of layers within a multilayer structure has been limited to selecting a random layer for analysis. As such, it was not possible to reliably isolate a particular selected layer to check the manufacturing process. The present disclosure overcomes these limitations by enabling and automating layer counting and marking within the multi-layer structure such that a specific desired layer within the multi-layer structure is isolated and analyzed.

As used in this application and in the claims, the singular forms “a,” “an,” and “the” include the plural forms unless the context clearly dictates otherwise. Additionally, the term “includes” means “comprises.” Further, the term “coupled” does not exclude the presence of intermediate elements between the coupled items.

The systems, apparatus, and methods described herein should not be construed as limiting in any way. Instead, the present disclosure is directed toward all novel and nonobvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections.

FIG. 1 schematically illustrates a multi-layer structure 10 to illustrate the systems and methods described herein. The multi-layer structure 10 is characterized by a length 18, a width 17, and a depth 19, and the multi-layer structure has a top surface 12. The multi-layer structure 10 includes a plurality of alternating layers 14 wherein the alternating layers have different material composition. For example, the alternating layers 14 can include conductive layers interleaved with insulating layers. Throughout this document, the term "wordline" (commonly associated with multi-layer structures that act as memory structures) is sometimes used interchangeably with the term "layer." The layers 14 can be formed by various processes including deposition or growth processes known in the semiconductor art. In some embodiments, the multi-layer structure 10 can comprise a three-dimensional or vertically stacked NAND memory device (e.g., 3D NAND or V-NAND), and the layer can be a conductive or insulating layer of the NAND memory device. The layers 14 can include any suitable material. In one non-limiting embodiment, the structure 10 can include layers 14 formed of an insulating material such as oxide alternating with layers or wordlines 14 formed of a conductive or semiconductive material such as nitride or tungsten. The layers 14 are grown or deposited sequentially in a vertical direction beginning with a bottom layer 14*c* and ending with a top layer 14*b*. A thickness 23 of the multi-layer structure 10 can be milled to enable visualization of the layers 14 from an edge of the structure 10.

In manufacturing applications, it can be desirable to isolate a specific selected layer 14*a* at a particular feature depth 21 within the structure 10 for further analysis and imaging to assess outcomes of the manufacturing operation to produce the structure 10. In particular, process information can be obtained when the selected layer 14*a* is isolated as a planar lamella that enables viewing from an orientation that is parallel to the depth 19 of the structure 10. Conventionally, isolation of a specific layer 14*a* (e.g., the fiftieth nitride wordline from the bottom of the stack) from an interim or final structure 10 has been difficult due to the complexities of visualizing and counting layers 14 and correlating this count information with the sample 10 in such a way that the specific layer 14*a* can be identified, isolated and analyzed. The systems and methods described herein enable this isolation process for a specific selected layer.

Figure 2:
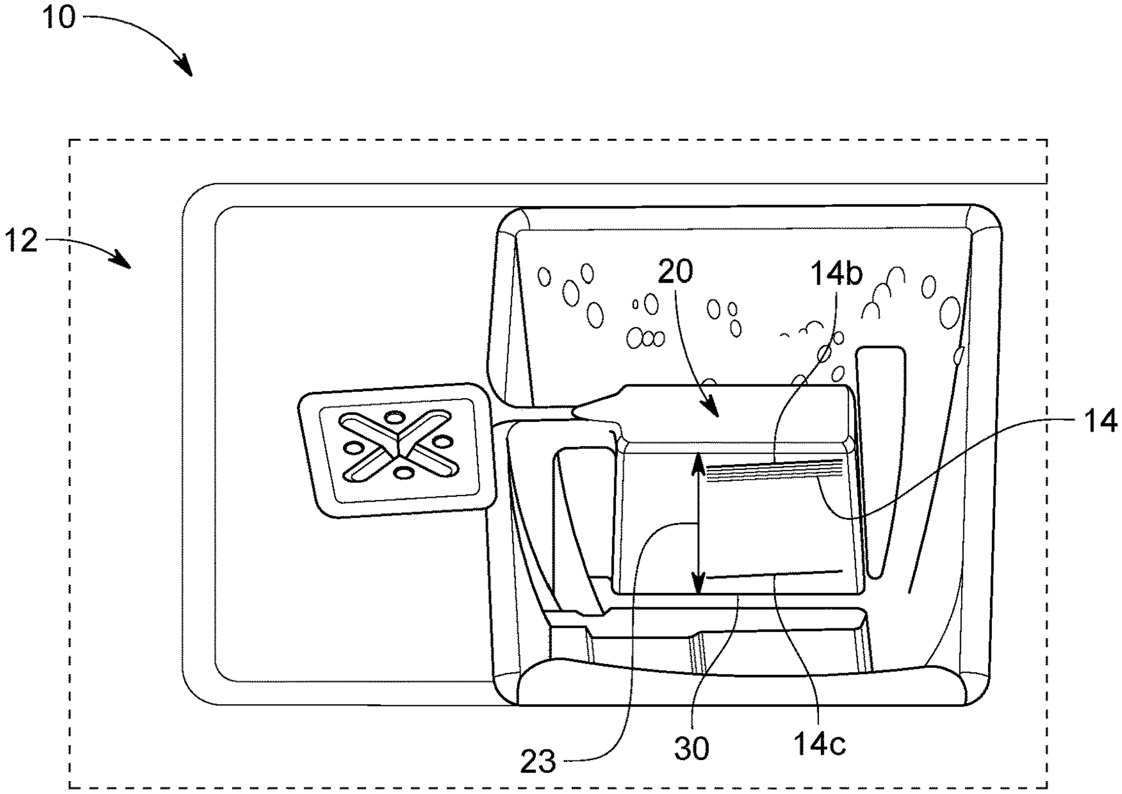
FIG. 2 shows an electron micrograph of the multi-layer structure during extraction of a portion or chunk of the structure for subsequent formation of a planar lamella in accordance with various embodiments described herein.

FIG. 2 shows an electron micrograph of the multi-layer structure 10 during extraction of a portion or chunk 20 of the structure 10 for subsequent formation of a planar lamella in accordance with various embodiments described herein. Various extraction operations known in the art can be used to remove material around the chunk 20 including charged particle milling or etching operations. Details of chunk preparation and the slice-and-view methodology are described below and also in U.S. Pat. No. 11,264,200 assigned to FEI Company and entitled "Lamella alignment based on a reconstructed volume," the entire contents of which are hereby incorporated by reference. In the image, the chunk 20 is suspended over an open pit by the bridge connection to the rest of the structure 10. The micrograph is captured at an angle with respect to the surface 12 such that layers 14 can be observed in the chunk 20. In this sample, a milling and polishing operation has been performed along the milling depth 23 on a part of the chunk 20 to improve visualization of the layers 14 along a cutface 30. In some embodiments, the cutface 30 can be positioned in relation to other features of the structure 10 such as trenches or channels so as to capture, or to avoid capturing, these features in cross-section. In some embodiments, the chunk 20 can be removed from the remainder of the structure and mounted to a standard mount such as an electron microscopy (EM) grid for further analysis and imaging.

Figure 3:
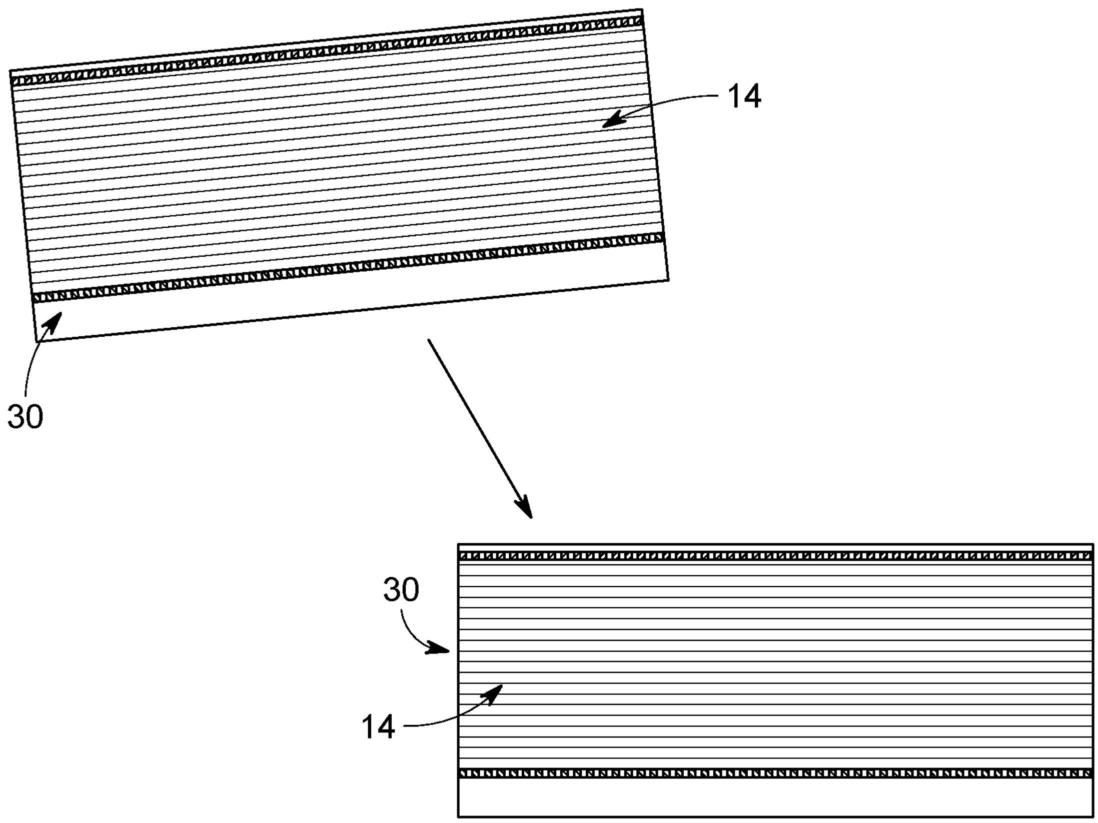
FIG. 3 illustrates a rotation operation to align the layers as seen in the cutface along a horizontal or vertical axis with respect to the imaging device.

FIG. 3 illustrates a rotation operation to align the layers 14 as seen in the cutface 30 along a horizontal or vertical axis with respect to the imaging device. Rotation can be achieved in one or more ways that can be performed alone or in combination. In some embodiments, rotation can be accomplished by physically rotating the chunk using stage rotation techniques within the dual beam system. In some embodiments, a skewed image of a chunk can be transformed using image processing techniques to produce a straightened digital image of the chunk that includes layers parallel to the horizontal or vertical axis of the image. For example, rotational alignment can be done using a Radon transform, analysis of a Fourier spectrum, or other arbitrary method fitting the use-case. In some embodiments, the rotation operation is optional as the cutface may be preemptively aligned.

Figure 4:
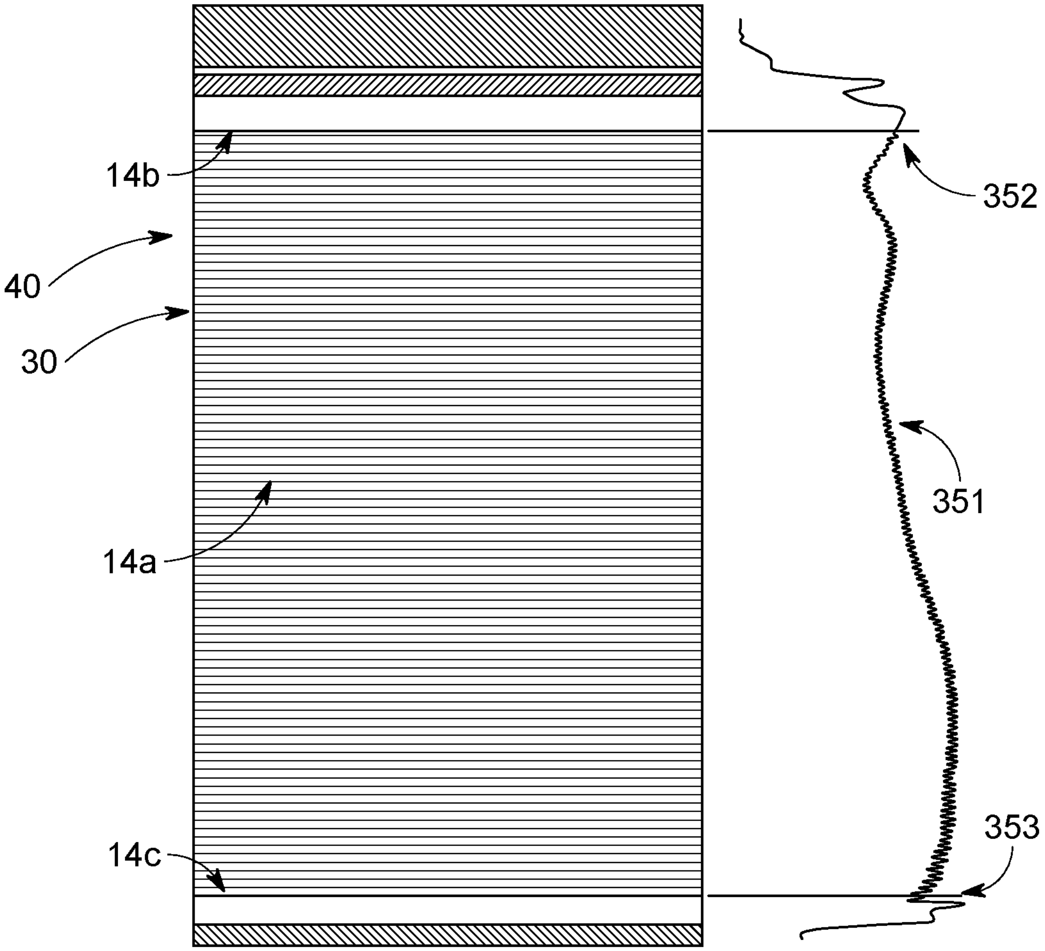
FIG. 4 schematically illustrates an example image of the aligned cutface (i.e., after rotation) when imaged using a dual beam system in accordance with various embodiments described herein.
Figure 5:
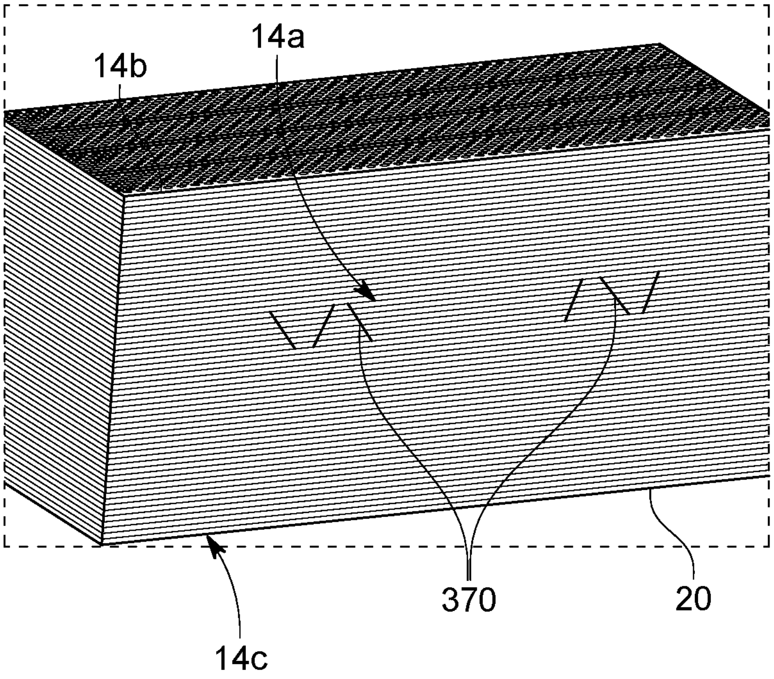
FIG. 5 illustrates the chunk of the multi-layer structure including physical marks that label the selected layer in accordance with various embodiments described herein.

FIG. 4 schematically illustrates an example image 40 of the aligned cutface 30 (i.e., after rotation) when imaged using the dual beam system. In some embodiments, the image 40 includes the selected layer 14*a*, the top layer 14*b*, and the bottom layer 14*c* as shown in FIG. 5. However, in other embodiments, only one of the top layer 14*b* or the bottom layer 14*c* can be present in the image 40. By including at least one of the top layer 14*b* or the bottom layer 14*c*, the position of the selected layer 14*a* within the stack of layers 14 can be established in an absolute sense with respect to the top layer 14*b* or the bottom layer 14*c*.

In some embodiments, the image 40 can be processed using a layer-counting module implemented within a computer system (such as by using computer-executable instructions stored in a non-transitory computer-readable medium)

as described in greater detail below with respect to FIG. 12. In some embodiments, the layer-counting module can process the image 40 to produce a curve 351. For example, pixel intensities in the image 40 can be summed or averaged in a direction perpendicular to a thickness of the layers 14 (e.g., a direction perpendicular to a thickness of the selected layer 14*a*, the top layer 14*b*, the bottom layer 14*c*) and/or in a direction perpendicular to the substrate depth 19 and/or in a direction perpendicular to the feature depth 21. The relative brightness of each layer 14 in the image 40 depends upon material properties of the layer 14, and intensity will be affected by the appearance of surrounding layers 14 as well. Because layers 14 with different material composition appear with different brightnesses in the image 40, the one-dimensional intensity curve 351 exhibits intensity variations that demarcate transitions between layers 14. For example, the small peak-to-peak variations in curve 351 shown in FIG. 4 are caused by transitions between oxide layers and nitride/tungsten layers. Note that the oxide layers can be relatively brighter or relatively darker than neighboring conductive layers in various embodiments. For example, an oxide-nitride-oxide structure appears in the image 40 with the nitride layers as darker and oxide layers as brighter whereas oxide-tungsten-oxide structures appear in the image 40 with the oxide layers as darker and the tungsten layers as brighter. In the situation where layers 14 are largely the same thickness, the intensity variations are periodic over the entire curve 351 or at least a portion of the curve 351. The curve 351 includes a first endpoint 352 corresponding to the top layer 14*b* and a second endpoint 353 corresponding to the bottom layer 14*c*. In between the first endpoint 352 and the second endpoint 353, the curve exhibits periodic variation due to the change in brightness of adjacent layers in the image 40. By detecting the wave shape, amplitude, and/or period, the layer-counting module can isolate the first endpoint 352, the last endpoint 353, or both the first endpoint 352 and the last endpoint 353 by detecting sharp changes in the periodicity. The layer-counting module can apply regression or function decomposition analysis to identify and extract a periodic function (e.g., sine wave) from the curve 351 or from a portion of the curve 351. Then, the layer-counting module can predict the location of the selected layer 14*a* by counting periods of the periodic function from either the first endpoint 352 or the second endpoint 353.

In some embodiments, there can be variance in the thicknesses of the layers. In such a case, it may not be possible to fit a curve (e.g., sinusoidal) over the entire length of the curve 351 from the first endpoint 352 to the second endpoint 353. For example, the determined sinusoidal function may fit well at one end of the curve (e.g., near first endpoint 352) but error caused by variance in thicknesses of the layers 14 can accumulate such that the function peaks do not fit the curve 351 in the vicinity of the second endpoint 353. In such a case, only a portion of the curve 351 can be fit using, e.g., regression analysis on a close neighborhood of peaks where the variance is negligible.

In some embodiments, the image 40 will include portions where layers 14 are blurred, indistinguishable, or otherwise cannot be seen, and the curve 351 consequently does not exhibit clear variations along the entire length from the first endpoint 352 to the second endpoint 353. This situation can arise when polishing of the cutface 30 is imperfect. In such cases, it can be difficult to locate the position of the selected layer 14*a* within the stack of layers 14. In the extreme case, the selected layer 14*a* may be invisible, and its position can be determined by extrapolation. The layer-counting module can identify the location of the selected layer 14*a* on the cutface 30 by extracting the periodic function from the portion of the curve 351 where variations are observable and extrapolating. The layer-counting module can determine the position of the selected layer 14*a* on the cutface 30 by measuring the distance for an appropriate number of periods of the periodic function from either the first endpoint 352 or the second endpoint 353. In the event that an insufficient number of layers 14 is visible to enable extraction of the periodic function, the layer-counting module can control the dual beam system to perform an additional polishing or milling operation to clean off or dust off the cutface 30.

Once the location of the selected layer 14*a* has been identified in the image 40 of the cutface 30, the location of the selected layer 14*a* can be physically marked on the cutface 30 in accordance with some embodiments described herein. FIG. 5 illustrates a chunk 20 including physical marks 370 that label the selected layer 14*a*. In some embodiments, a technique known as line indicated termination (LIT) can be used to mill marks into the cutface 30 that act as references during subsequent thinning operations that reduce the chunk 20 to the planar lamella. The LIT technique appropriate for use with systems and methods described herein is described in greater detail in U.S. patent application Ser. No. 16/917,727 by Routh et al. entitled "Line-based endpoint detection," the entire contents of which is incorporated herein by reference.

The layer-counting module can compare the location of the LIT marks with the predicted location of the selected layer 14*a*. If the LIT marks deviate from the predicted location due to, for example, pattern misalignment, the layer-counting module can determine a measured offset to be saved and applied throughout subsequent thinning processes.

In alternative embodiments, the location of the selected layer 14*a* within the chunk 20 can be stored in a memory of a computing system that operates the dual beam system. The location can then be tracked in the coordinate system of the dual beam system as the chunk is rotated and/or translated for subsequent thinning operations.

After identifying the location of the selected layer 14*a*, the chunk 20 can be thinned to remove layers other than the selected layer 14*a* and, additionally, other undesired material such as a substrate onto which the layers were grown. The thinning process can be conducted at different levels of coarseness wherein larger amounts of material are removed per pass at first and smaller amounts of material are moved with each thinning pass as the planar lamella approaches final form. In some embodiments, a support bridge can be formed before thinning processes begin to provide additional support to the final planar lamella to prevent bending or other undesirable deformations. In other embodiments, a thinning window can be used to ensure that the lamella remains stable during processing operations.

In some embodiments, the planar lamella must be well polished in order to be useful for TEM analysis. In order to achieve this condition, the lamella can be thinned in steps, where each step has a lower voltage than the previous one. In some embodiments, endpointing (e.g., arriving at the selected layer by removing material and possibly using LIT as described above) can be done at 30 kV resulting in a fairly thick lamella wherein the selected layer 14*a* is in the center of the lamella. At this point, an intensity monitoring module 1052 can be used to remove material in finer steps resulting in the final planar lamella. The intensity monitoring module 1052 can be implemented within a computer system as described in greater detail below with respect to FIG. 12. In some embodiments, intensity monitoring can be done in two steps, the first of which uses 5 kV voltage and the other 2 kV voltage. The goal of an intensity monitoring step can be to stop material removal at a correct position on both sides of the lamella. For example, the first step that employs a 5 kV beam can result in a lamella thickness of about 25 nm from the center of the target layer whereas the second step using a 2 kV (i.e., lower energy) beam can stop at the point where the final lamella contains only the selected layer 14*a*. The intensity monitoring module operates by calculating statistics from an image taken from the cutface of the lamella (i.e., perpendicular to the cutface 30 of the chunk 20 and parallel to the top surface 12 of the multi-layer structure 10) during the slice and image process. The statistics are analyzed to observe intensity changes in order to find borders between the layers/wordlines and to approximate the current distance from the target layer (i.e., how much remaining material must be removed before the selected layer 14*a* is revealed).

Figure 6:
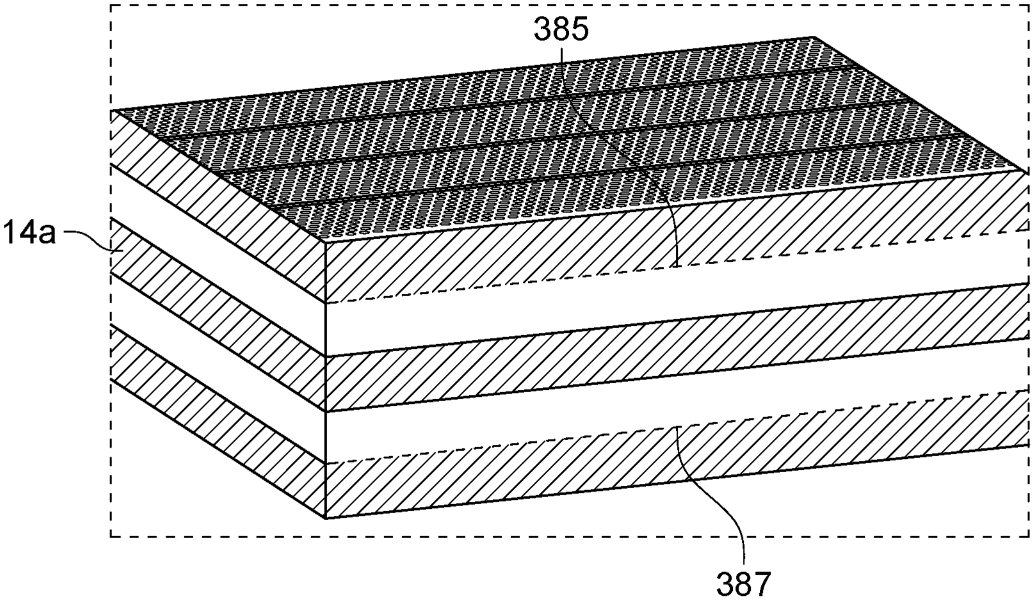
FIGS. 6 and 7 illustrate interim structures in the process of thinning the chunk to a final planar lamella.

FIG. 6 schematically illustrates an interim structure in the process of thinning the chunk 20 to the planar lamella including the selected layer 14*a*. In some embodiments, the interim structure shown in FIG. 6 is created using the high energy beam (e.g., 30 kV) and is now ready for the intensity monitoring module to initiate the first stage of intensity monitoring. When only a few (e.g., five) layers remain in the structure, a finer material removal process can be used. For example, the change from coarser to finer material removal processes can begin when the interim structure is around 120 nm thick. In some embodiments, the voltage of the milling beam can be reduced from 30 kV or 25 kV to 5 kV. During the thinning process, the interim structure can be positioned within the dual beam system such that the layers 14 can be imaged using a first charged particle modality (e.g., electron microscopy) while the top and/or bottom of the structure can simultaneously be milled or dusted away using a second charged particle modality (e.g., ion beam).

As material removal is done in finer steps, it can take multiple passes of material removal to remove a single layer. As each layer begins to be removed, the resulting surface of the structure as viewed from the top (i.e., normal to the top surface) undergoes intensity changes. For example, a "darker" layer (i.e., a layer with lower brightness as viewed in an electron microscope image) can be removed to reveal a "brighter" layer (i.e., a layer with higher brightness as viewed in an electron microscope image) underneath. In some embodiments, an intensity monitoring module can identify and monitor intensity changes in the planar view of the structure for each round of material removal. For example, the intensity monitoring module can identify how many passes of ion milling at a particular applied voltage occur between a first intensity change (i.e., light to dark) and a second intensity change (i.e., dark to light). In other words, the thickness of material removed in each pass/slice by the ion beam can be calculated by counting the number of passes/slices that it takes to mill through a layer as determined by intensity changes. Because the thickness of layers in the sample is often well-understood based upon the deposition processes used to create the layers, the intensity monitoring module can divide the identified number of passes by the estimated thickness of a layer to determine the depth of material that is removed in each pass. The intensity monitoring module can then control the number of subsequent material removal passes to perform to reach a desired endpoint. For example, the desired endpoint can be an upper endpoint 385 that is higher in the vertical stack of layers than the selected layer 14*a* or a lower endpoint 387 that is lower in the vertical stack of layers than the selected layer 14*a*. Calibration of the system such that the depth of material removed by each slice is known as described above also enables the ability to stop the slicing operation at an arbitrary, but well characterized, position within a layer 14 by establishing the number of slices that must be taken starting at a top surface of the layer 14 (determined by intensity change from the layer above).

The intensity monitoring module can transition from the first stage to the second stage at any appropriate thickness of the interim structure. Thus, the upper endpoint 385 or lower endpoint 387 can be at a border between any two layers before the selected layer 14*a* or can be a specified distance away from the selected layer 14*a*. For example, the upper endpoint 385 or lower endpoint 387 can be a border between other two preceding layers or an arbitrary distance to the center of the selected layer 14*a* in nanometers. Conventionally, due to the nature of the sample, the intensity of the top face of the interim structure when viewed in an image does not change while slicing through a layer when the procedure is not close to a neighboring layer. As a result, guessing an accurate distance from the target has been difficult. In the present systems and methods, this distance from the target (e.g., selected layer 14*a*) can be calculated with a certain degree of error based on the statistics of slicing through a preceding layer. In some examples, the intensity monitoring module can determine the parameters to slice away material up to the upper endpoint 385 or the lower endpoint 387 using statistical analysis of historical slicing attributes, e.g., how many slicing passes it took to descend through previous layers. The historical slicing attributes may be stored in a memory of a computing device. The historical slicing attributes may be different for different materials, and so separate attributes may be saved corresponding to different classes or categories of material layers. The intensity monitoring module can accept as inputs the distance to the center of the target layer (selected layer 14*a*) after a previous step (e.g., the endpointing described previously with a stopping condition such as 60 nm from the target) and an approximate layer thickness. In some embodiments, the layer thickness in the multi-layer structure might vary. In an example embodiment, each layer is about 20 nm thick, and endpointing can finish about 60 nm from the target layer on each side. Thus, a variance in the layer thickness of the order of a few nanometers will not play a role in determining how many layers remain on each side of the target layer, as there will only be a few, for example 3 layers.

Figure 7:
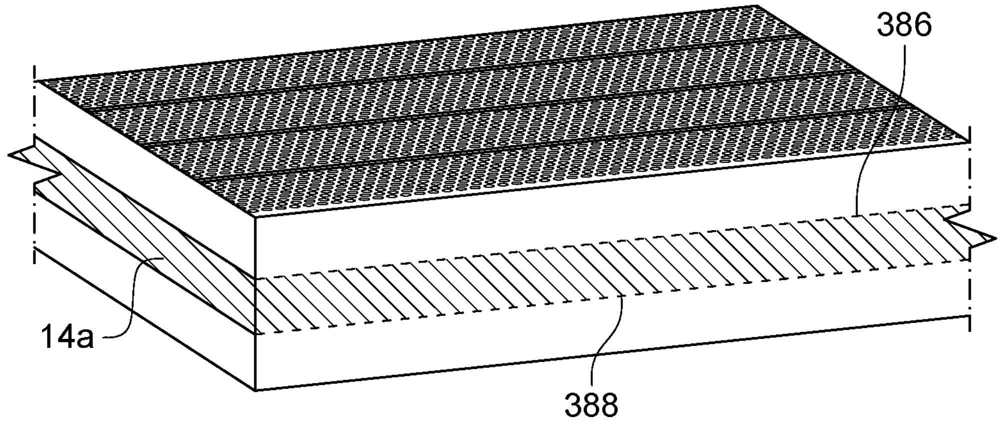

Once the material has been thinned to the upper endpoint 385 and/or the lower endpoint 387, the material removal operation can be tuned to even finer levels of material removal wherein a smaller depth of material is removed with each pass of the operation. For example, the applied voltage in an ion milling operation can be reduced from 5 kV to 2 kV, 0.5 kV, or another suitable voltage. FIG. 7 illustrates an interim structure that is even thinner than the structure illustrated in FIG. 6. The interim structure can be further thinned with a fine material removal process from a top side until a top endpoint 386 is reached. Similarly, the interim structure can be thinned from a bottom side until a bottom endpoint 388 is reached. The intensity monitoring module can continue to monitor the depth of each material removal pass based upon intensity changes and can determine that the top endpoint 386 or bottom endpoint 388 has been reached based upon a final change in intensity. In some embodiments, the systems and methods herein can thin material to within less than 10 nm of the top endpoint 386 or the bottom endpoint 388.

In some embodiments, the top endpoint 386 coincides with a top surface of the selected layer 14*a* and the bottom endpoint 388 coincides with a bottom surface of the selected layer 14*a*. After the final thinning operation, the planar lamella is formed including the selected layer 14*a*. In some embodiments, the planar lamella has a thickness of about 20 nm±4 nm.

Figure 8A:
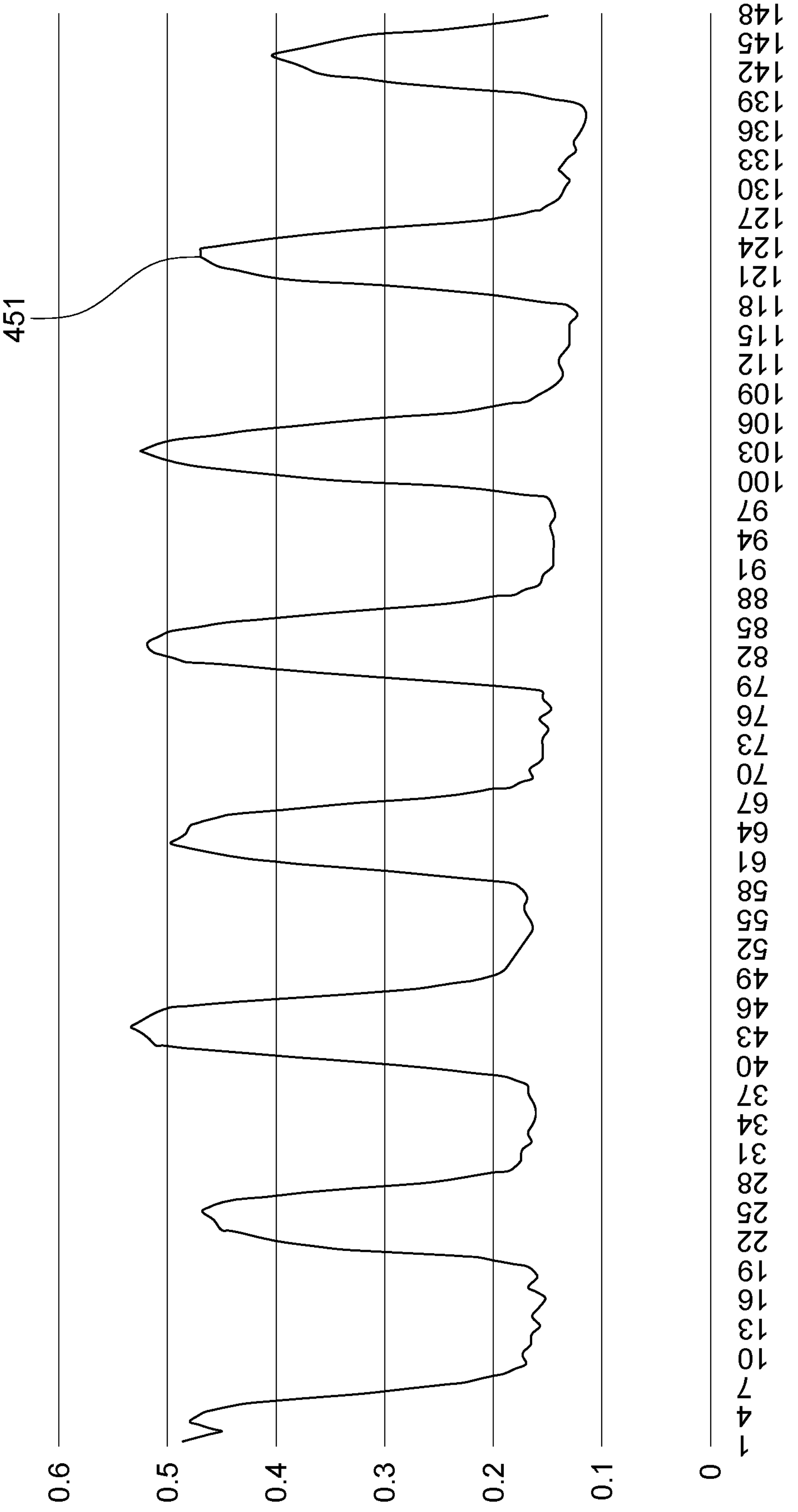
FIG. 8A illustrates the measured intensity in a sequence of charged particle microscopy images of the top face of an interim structure during the first stage of the slicing process through around 12-13 layers of material in accordance with some embodiments.
Figure 8B:
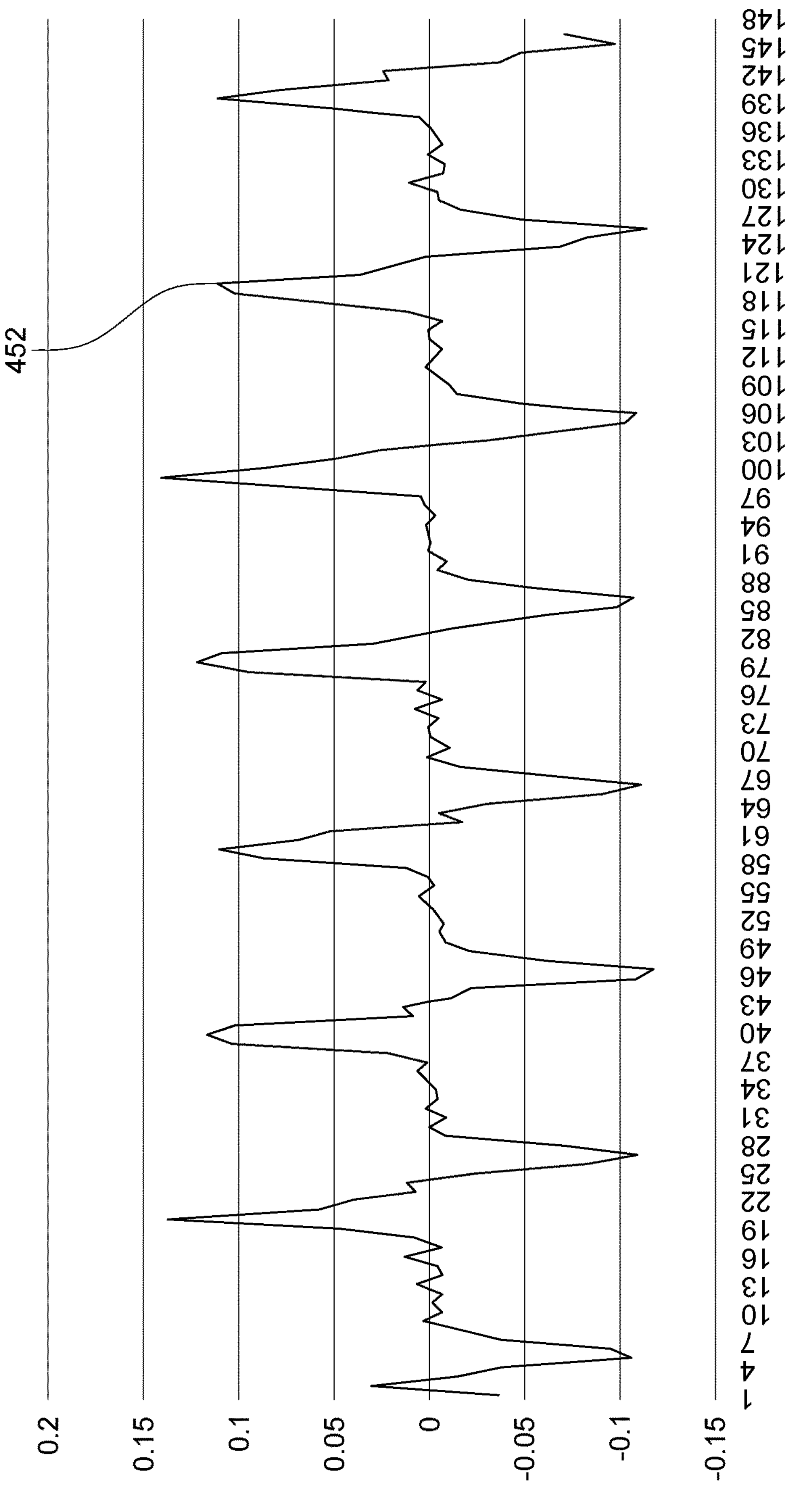
FIG. 8B illustrates the change in intensity in FIG. 8A (e.g., by taking the derivative of the curve in FIG. 8A).

FIG. 8A illustrates a curve 451 showing the measured intensity as a function of image number for a sequence of charged particle microscopy images of the top face of an interim structure during the first stage of the slicing process through around 12-13 layers of material. Each image is captured after a material removal pass or "slice" has been conducted. FIG. 8B illustrates a curve 452 showing the change in intensity in FIG. 8A (e.g., by taking the derivative of the curve in FIG. 8A). Using the approach described herein above, the intensity monitoring module is able to count the number of layers that have already been sliced through. Combined with the knowledge of how many layers are left before the target layer, the intensity monitoring module can stop material removal at, for example, a border between any two layers before the target layer. In alternative cases where the endpoints are an arbitrary distance from the target, the intensity monitoring module can direct the dual beam system to slice through at least one layer to determine an approximate number of passes that are required to slice through one layer. In examples where different materials are removed at different rates by the ion beam, the intensity monitoring module can direct the dual beam system to slice through at least a second layer having different material composition than the first layer to determine an approximate number of passes that are required to slice through the second layer. Conventionally, it has not been possible at moderate voltages (e.g., 5 kV) to rely on the slice thickness inputted by a user during the slice-and-image process. The current intensity monitoring method overcomes this inaccuracy. By determining slice thickness using knowledge from slicing through one layer, by having an anchor from which to start (in the form of a border between two layers), and by knowing the approximate layer thickness and number of layers before the target (enabling calculation of an approximate distance of each layer border from the target), the intensity monitoring module can approximate a distance from the target after any number of slices even starting from a position that is not on a layer border.

A specific and non-limiting example is now described. In the first stage (e.g., at 5 kV) of intensity monitoring (i.e., after marking of the selected layer 14*a* using a LIT mark), the interim structure is 135 nm thick with the selected layer 14*a* in a center of the interim structure. Below, 'O' denotes 5 nm of oxide layer and 'N' denotes 5 nm of nitride layer, where layer thickness is 25 nm in this particular case. The target layer is the nitride layer in the center (represented by use of bold font). The goal is to endpoint the first stage at 30 nm from the center of the target layer on each side.

Lamella: ONNNNNOOOOONNNNNOOOOON-NNNNO—135 nm

Start slicing from one side and find the first border based on intensity change:

NNNNNOOOOONNNNNOOOOONNNNNO

Continue slicing from one side and find a second border based on the intensity change. Remember how many slices/passes were performed:

OOOOONNNNNOOOOONNNNNO

Let's say 50 slices were taken. Given a layer thickness of 25 nm, each slice operation is removing 0.5 nm of material. We know our current distance from the center of the target layer, which is 25 nm for the 'O' layer plus 12.5 nm for the half of the target layer, giving us 37.5 nm. Since we want to set the endpoint at 30 nm from the target layer, that means we need to slice off an additional 7.5 nm of material. 7.5 nm divided by the slice thickness of 0.5 nm gives us 14 slices. We therefore slice for an additional 14 slices and stop the process:

OOONNNNNOOOOONNNNNO

Now we repeat the same process from the other side and end up with the desired result after the first stage:

OOONNNNNOOO

The intensity monitoring module now switches to the second, finer mode at a lower voltage for finer material removal per pass. In this step, the goal is to isolate the target layer. To achieve this, we start slicing from one side and find the first border based on intensity change:

NNNNNOOO

Next, we repeat this from the other side:

NNNNN

The procedure is now finished, and the planar lamella contains only the selected layer 14*a*. If it is desired to thin the lamella further, the "slice thickness" (e.g., amount of material removed in each pass) can be approximated by dividing how far away we were from the target after the first stage by how many slices were taken before the border was reached.

In some embodiments, thinning of the interim structure to the final planar lamella can be conducted by capturing images of the thinning process from a different angle and calculating the thickness of the lamella or interim structure using image processing. In this setup, the selected layer 14*a* is visible and is not destroyed during the slicing process. The thinning process ends when the planar lamella has the correct thickness as determined by processing the images at the off-angle view.

Figure 9:
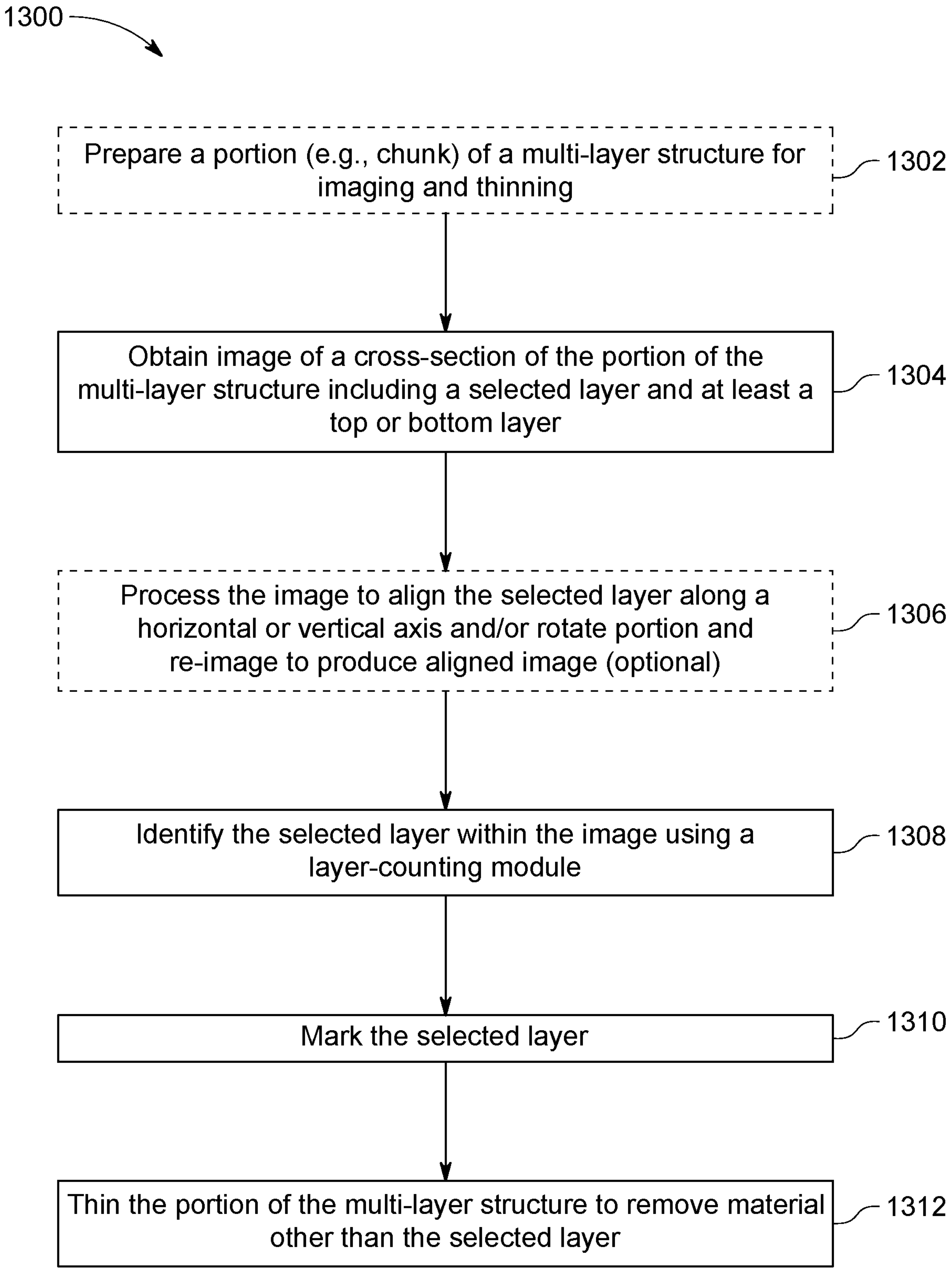
FIG. 9 is an example flowchart illustrating a method of preparing the planar lamella including the selected layer in accordance with various embodiments described herein.

FIG. 9 is an example flowchart of a method 1300 for forming a planar lamella including the selected layer 14*a* according to some embodiments described herein. The method 1300 optionally includes preparing the portion (e.g., chunk 20) of the multi-layer structure 10 for imaging and thinning (step 1302). The method 1300 includes obtaining the image of a cross-section of the portion 20 of the multi-layer structure 10 including the selected layer 14*a* and the top layer 14*b*, the bottom layer 14*c*, or both the top layer 14*b* and the bottom layer 14*c* (step 1304). For example, the chunk 20 can be milled to create a cutface 30 that can be imaged using imaging devices in the dual beam system described herein.

The method 1300 includes an optional step of processing the image to align the selected layer 14*a* along a horizontal or vertical axis and/or physically rotating the chunk 20 and re-imaging the cross-section to produce an aligned image (step 1306). For example, the rotation can be performed as described above in relation to FIG. 3. The method 1300 includes identifying the selected layer 14*a* within the plurality of layers 14 using the layer-counting module (step 1308). The method 1300 includes marking the selected layer (step 1310). The method 1300 includes thinning the chunk 20 to remove material other than the selected layer 14*a* to produce the planar lamella that includes only (or primarily) the selected layer 14*a*.

Figure 10:
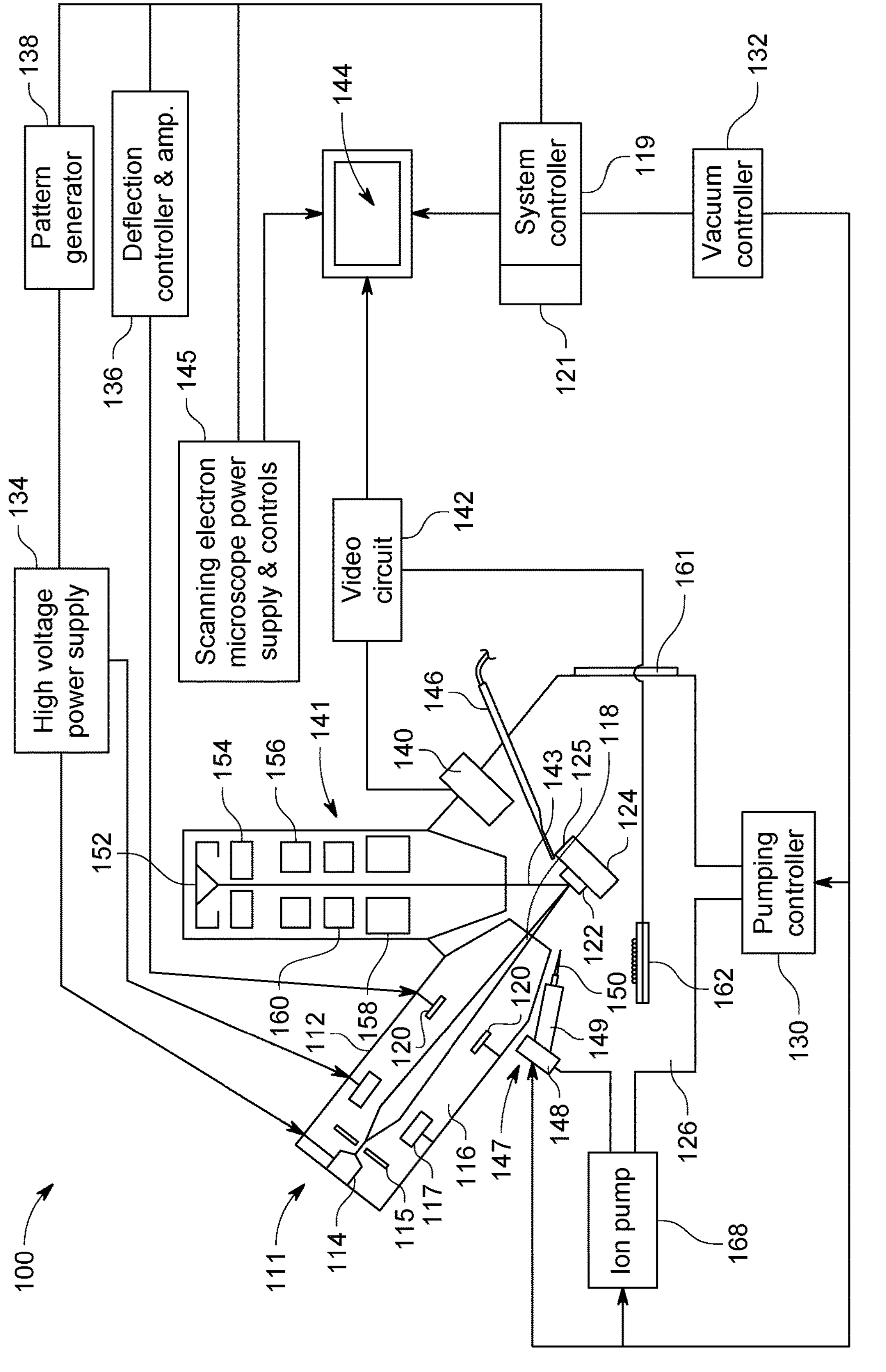
FIG. 10 is an example dual beam system for preparing and imaging the planar lamella in accordance with various embodiments of the present disclosure.

FIG. 10 is an example dual beam system 100 for preparing and imaging the planar lamella in accordance with various embodiments of the present disclosure. System 100 may be used to implement the sample orientation techniques discussed herein. In some embodiments, the system 100 will perform the sample milling, orientation algorithms and sample orientation. However, in other embodiments, the orientation algorithms may be performed by a computing system coupled to system 100, such as at a user's desk or a cloud-based computing system. In either embodiment, the determination of optimum orientation may be provided to system 100 for automatic sample reorientation to ensure structures within the sample are parallel with a FIB optical axis. While an example of suitable hardware is provided below, the invention is not limited to being implemented in any particular type of hardware.

An SEM 141, along with power supply and control unit 145, is provided with the dual beam system 100. An electron beam 143 is emitted from a cathode 152 by applying voltage between cathode 152 and an anode 154. Electron beam 143 is focused to a fine spot by means of a condensing lens 156 and an objective lens 158. Electron beam 143 is scanned two-dimensionally on the specimen by means of a deflector 160. Operation of condensing lens 156, objective lens 158, and deflector 160 is controlled by power supply and control unit 145.

Electron beam 143 can be focused onto substrate 122, which is on stage 125 within lower chamber 126. Substrate 122 may be located on a surface of stage 125 or on TEM sample holder 124, which extends from the surface of stage 125. When the electrons in the electron beam strike substrate 122, secondary electrons are emitted. These secondary electrons are detected by secondary electron detector 140. In some embodiments, STEM detector 162, located beneath the TEM sample holder 124 and the stage 125 collects electrons that are transmitted through the sample mounted on the TEM sample holder.

System 100 also includes FIB system 111 which comprises an evacuated chamber having an ion column 112 within which are located an ion source 114 and focusing components 116 including extractor electrodes and an electrostatic optical system. The axis of focusing column 116 may be tilted, 52 degrees for example, from the axis of the electron column 141. The ion column 112 includes an ion source 114, an extraction electrode 115, a focusing element 117, deflection elements 120, which operate in concert to form focused ion beam 118. Focused ion beam 118 passes from ion source 114 through focusing components 116 and between electrostatic deflection means schematically indicated at 120 toward substrate 122, which may comprise, for example, a semiconductor wafer positioned on movable stage 125 within lower chamber 126. In some embodiments, a sample may be located on TEM grid holder 124, where the sample may be a chunk extracted from substrate 122. The chunk may then undergo further processing with the FIB to form a final lamella of a desired thickness in accordance with techniques disclosed herein.

Stage 125 can move in a horizontal plane (X and Y axes) and vertically (Z axis). Stage 125 can also tilt and rotate about the Z axis. In some embodiments, a separate TEM sample stage 124 can be used. Such a TEM sample stage will also preferably be moveable in the X, Y, and Z axes as well as tiltable and rotatable. In some embodiments, the tilting of the stage 125/TEM holder 124 may be in and out of the plane of the ion beam 118, and the rotating of the stage is around the ion beam 118. As used herein to illustrate the disclosed techniques, such relationship will be maintained when discussing rotation and tilting of a sample. Of course, the opposite definitions could be used but would still fall within the contours of the present disclosure.

A door 161 is opened for inserting substrate 122 onto stage 125. Depending on the tilt of the stage 124/125, the Z axis will be in the direction of the optical axis of the relevant column. For example, during a data gathering stage of the disclosed techniques, the Z axis will be in the direction, e.g., parallel with, the FIB optical axis as indicated by the ion beam 118. In such a coordinate system, the X and Y axis will be referenced from the Z-axis. For example, the X-axis may be in and out of the page showing FIG. 1, whereas the Y-axis will be in the page, all while all three axes maintain their perpendicular nature to one another.

An ion pump 168 is employed for evacuating neck portion 112. The chamber 126 is evacuated with turbomolecular and mechanical pumping system 130 under the control of vacuum controller 132. The vacuum system provides within chamber 126 a vacuum of between approximately 1×10-7 Torr and 5×10-4 Torr. If an etch assisting, an etch retarding gas, or a deposition precursor gas is used, the chamber background pressure may rise, typically to about 1×10-5 Torr.

The high voltage power supply provides an appropriate acceleration voltage to electrodes in focusing column 116 for energizing and focusing ion beam 118. When it strikes substrate 122, material is sputtered, that is physically ejected, from the sample. Alternatively, ion beam 118 can decompose a precursor gas to deposit a material.

High voltage power supply 134 is connected to ion source 114 as well as to appropriate electrodes in ion beam focusing components 116 for forming an approximately 1 keV to 60 keV ion beam 118 and directing the same toward a sample. Deflection controller and amplifier 136, operated in accordance with a prescribed pattern provided by pattern generator 138, is coupled to deflection plates 120 whereby ion beam 118 may be controlled manually or automatically to trace out a corresponding pattern on the upper surface of substrate 122. In some systems the deflection plates are placed before the final lens, as is well known in the art. Beam blanking electrodes (not shown) within ion beam focusing column 116 cause ion beam 118 to impact onto blanking aperture (not shown) instead of substrate 122 when a blanking controller (not shown) applies a blanking voltage to the blanking electrode.

The ion source 114 typically provides an ion beam based on the type of ion source. In some embodiments, the ion source 114 is a liquid metal ion source that can provide a gallium ion beam, for example. In other embodiments, the ion source 114 may be plasma-type ion source that can deliver a number of different ion species, such as oxygen, xenon, and nitrogen, to name a few. The ion source 114 typically is capable of being focused into a sub one-tenth micrometer wide beam at substrate 122 or TEM grid holder 124 for either modifying the substrate 122 by ion milling, ion-induced etching, material deposition, or for the purpose of imaging the substrate 122.

A charged particle detector 140, such as an Everhart Thornley or multi-channel plate, used for detecting secondary ion or electron emission is connected to a video circuit 142 that supplies drive signals to video monitor 144 and receiving deflection signals from a system controller 119. The location of charged particle detector 140 within lower chamber 126 can vary in different embodiments. For example, a charged particle detector 140 can be coaxial with the ion beam and include a hole for allowing the ion beam to pass. In other embodiments, secondary particles can be collected through a final lens and then diverted off axis for collection.

A micromanipulator 147 can precisely move objects within the vacuum chamber. Micromanipulator 147 may comprise precision electric motors 148 positioned outside the vacuum chamber to provide X, Y, Z, and theta control of a portion 149 positioned within the vacuum chamber. The micromanipulator 147 can be fitted with different end effectors for manipulating small objects. In the embodiments described herein, the end effector is a thin probe 150.

A gas delivery system 146 extends into lower chamber 126 for introducing and directing a gaseous vapor toward substrate 122. For example, iodine can be delivered to enhance etching, or a metal organic compound can be delivered to deposit a metal.

System controller 119 controls the operations of the various parts of dual beam system 110. Through system controller 119, a user can cause ion beam 118 or electron beam 143 to be scanned in a desired manner through commands entered into a conventional user interface (not shown). Alternatively, system controller 119 may control dual beam system 110 in accordance with programmed instructions stored in a memory 121. In some embodiments, dual beam system 110 incorporates image recognition software to automatically identify regions of interest, and then the system can manually or automatically extract samples in accordance with the invention. For example, the system could automatically locate similar features on semiconductor wafers including multiple devices and take samples of those features on different (or the same) devices.

In operation in accordance with the techniques disclosed herein, system 100 images a working surface of a sample 122, the sample 122 being a chunk previously removed from a substrate. The chunk, which may be about 1 micron in thickness, may be attached to TEM holder 124 in this example. As used herein, the working surface is a side surface of the chunk, the chunk needing to be thinned into a final lamella thickness. The sample 122 may include structures that should be aligned/oriented to the ion beam 118, such as in terms of rotation and/or tilt, so that during the final lamella formation, structures that require subsequent imaging are not removed. The image of the newly exposed surface can be acquired using either the electron column 141 or the FIB 111.

After image acquisition, a layer of sample 122 is removed from the working surface. The removal of the layer, or slice, may be performed using FIB milling or ion induced etching using a gas precursor. The removed layer may be, for example, 2 to 5 nanometers in thickness. After the slice is removed, the newly exposed surface is imaged. The process of image acquisition and slice removal may be repeated for 25, 50, 75, or 100 times, but any other number of slices are contemplated herein. In general, a small portion of the sample 122, e.g., a small volume of the chunk, is removed that includes 2 or more lines of structures, such as FETs, which allow analysis of orientation of the structures with respect to the ion beam 118. This process may be known as slice-and-view to those of skill in the art and can be used to acquire data to reconstruct a 3D volume of sample 122.

The 3D reconstructed volume may then be used as the basis for determination of the optimum orientation, e.g., rotation and tilt, of sample 122 to ensure the buried structures are parallel to the ion beam 118. In terms of coordinates, the Z-direction of the reconstructed volume is in the direction of the removed slices, and the X and Y directions are in the plane of those slices. To determine the optimum orientation, a plurality of planes in either the XZ or YZ plane of the reconstructed volume are subject to an integral transform, such as a radon transform, to assist the orientation determination. For example, each plane is virtually rotated to a number of different angles within a range around the current orientation of the sample 122, such as from −1.5° to +1.5° and a respective transform is obtained at each angle. Alternatively, each plane of the plurality of planes are mathematically transformed at a different angle within the range of angles. Of course, a single plane may be extracted from the volume and subject to the mathematical transform at the different angles, but the statistical relevance of such data may not be sufficient.

Each transform may then be statistically characterized. For example, a standard deviation or variance may be computed for each transform. Subsequently, the statistical data of each transform may then be evaluated to determine the optimum orientation. For example, a maximum standard deviation value, or interpolation based on an associated plot, may indicate the optimum orientation, e.g., rotation and/or tilt, for the sample 122 to ensure the buried structures are aligned as needed. This optimum orientation may then be relayed back to the control system 119, for example, so that the stage 125 is automatically reoriented based on the analysis.

Figure 11:
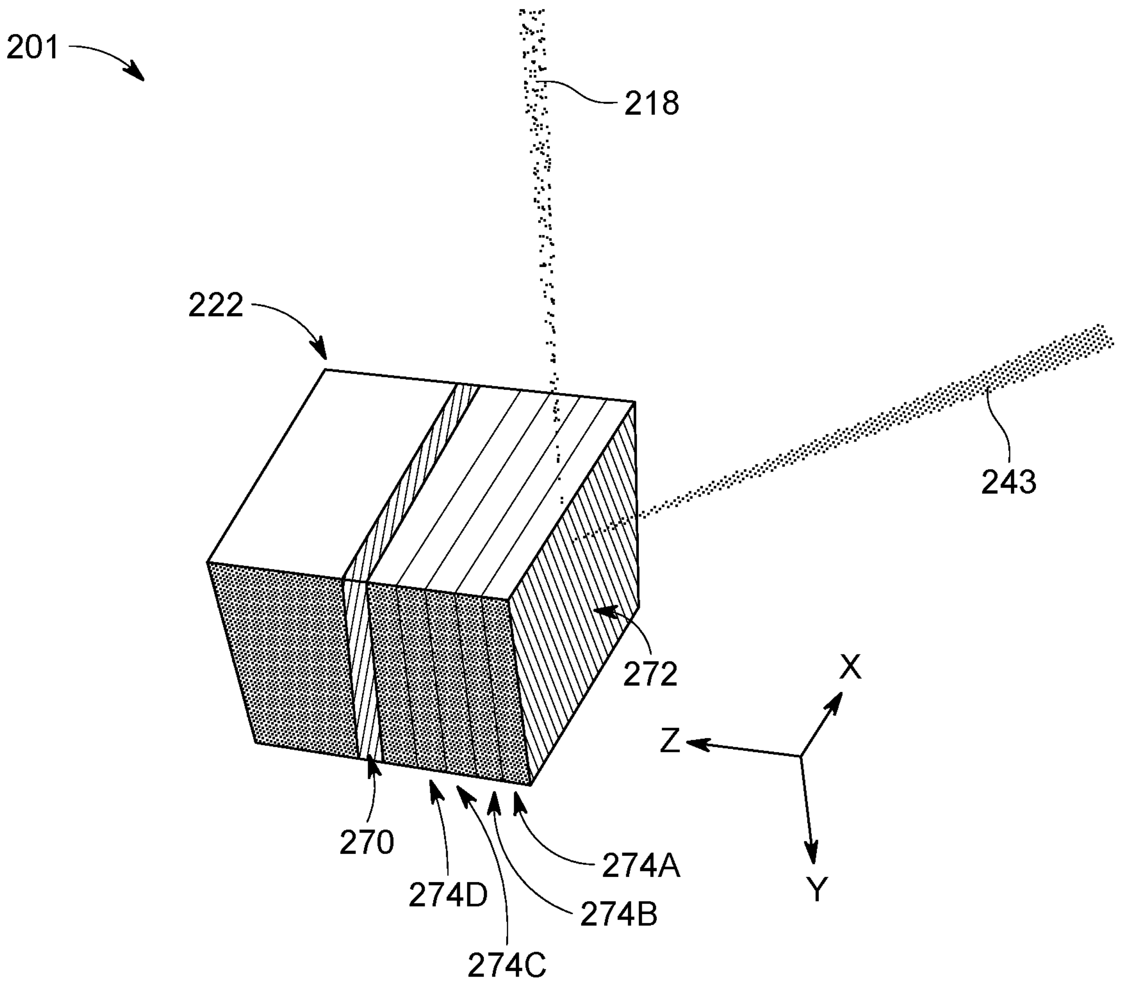
FIG. 11 is an example sample processing workflow in accordance with an embodiment of the present disclosure.

FIG. 11 is an example sample processing workflow 201 in accordance with an embodiment of the present disclosure. The workflow 201 illustrates a sample milling and imaging technique that can also be referred to as slice-and-view. In the disclosed technique, slice-and-view is used to obtain data on the sample to inform desired orientation with respect to a working charged particle beam, such as an ion beam. The workflow 201 may be performed by a dual beam charged particle microscope, such as system 100 for example, and is more directed to the data gathering aspect of the disclosed techniques. The analysis aspects will be discussed in more detail below.

The workflow 201 is performed on sample 222, which is an example of sample 122, and which may be mounted on a stage, such as stage 125, or mounted on a TEM grid hold, such as TEM grid holder 124. In either mounting configuration, sample 222 may be a chunk of a larger sample, such as a patterned wafer or a packaged IC, and includes a region of interest (ROI) 270. ROI 270 may include one or more lines or rows of structures, such as FET structures, desired to be analyzed by subsequent imaging techniques, such as TEM or STEM. Imaging such structures may require their extraction from sample 222 in the form of a lamella. However, to extract such structures, sample 222 is processed to form the lamella that mainly includes ROI 270, which includes removing the volume of sample 222 surrounding ROI 270, at least in the Z direction. In some examples, sample 222 may be around 1 micron in thickness, in the Z direction in this example, but a lamella with thickness from 7 to 25 nanometers is desired for the TEM/STEM analysis. As such, the volume of sample 222 surrounding ROI 270 in the Z direction needs to be removed. However, if the sample 222, or more importantly the structures within the sample 222, are not aligned parallel to the working charged particle beam, the ion beam 218 in this example, there is a chance the structures desired to be imaged may be removed in the lamella formation process. As such, the disclosed orientation techniques acquire data regarding the orientation of the structures during early stages of lamella formation that allows adjustments to be made to the orientation of the structures to the ion beam 218 to limit or prevent such removal of the desired structures.

To that end, workflow 201 uses ion beam 218 to remove material from sample 222 and images newly exposed surfaces 272 with electron beam 243. A newly exposed surface 272 will be formed after the removal of each slice of sample 222. For example, ion beam 218 removes slice 274A exposing a new surface 272. The removal of slice 274A, and subsequent slices, can be performed by milling the slice away using the ion beam 218, or it can be removed using ion beam induced etching by bleeding a gas precursor to the surface 272, which then etches away the slice through interaction with the ion beam 218. Each slice may remove a thickness of material in a range from 0.25-5 nm, 0.5-1 nm, 1-5 nm, 0.5-2.5 nm, or any other suitable range depending upon voltage of the ion beam, but the size of the structures within sample 222 may determine the desired slice thickness. For example, smaller structures may require thinner slices, whereas larger structures can stand thicker slices. As the workflow progresses, slice 274B is removed then an image of the newly exposed surface 272 is acquired. This two-step process may then repeat for the removal of slices 247C and 274D.

The workflow 201 may only remove or use a relatively small volume of sample 222 to determine the orientation of the structures and how to adjust the orientation so that the structures are parallel to the ion beam 218. For example, 50 to 100 nanometers of material may be removed from sample 222 to perform the analysis disclosed herein. In general, the thickness of sample 222 needed for the disclosed techniques may depend on the number of lines/structures removed and whether the amount of resulting data is enough to satisfy the analysis. For example, three lines of structures may be enough to implement the disclosed techniques. The reorientation may include rotation around the y-axis, tile around the x-axis, and/or translation in any direction.

Figure 12:
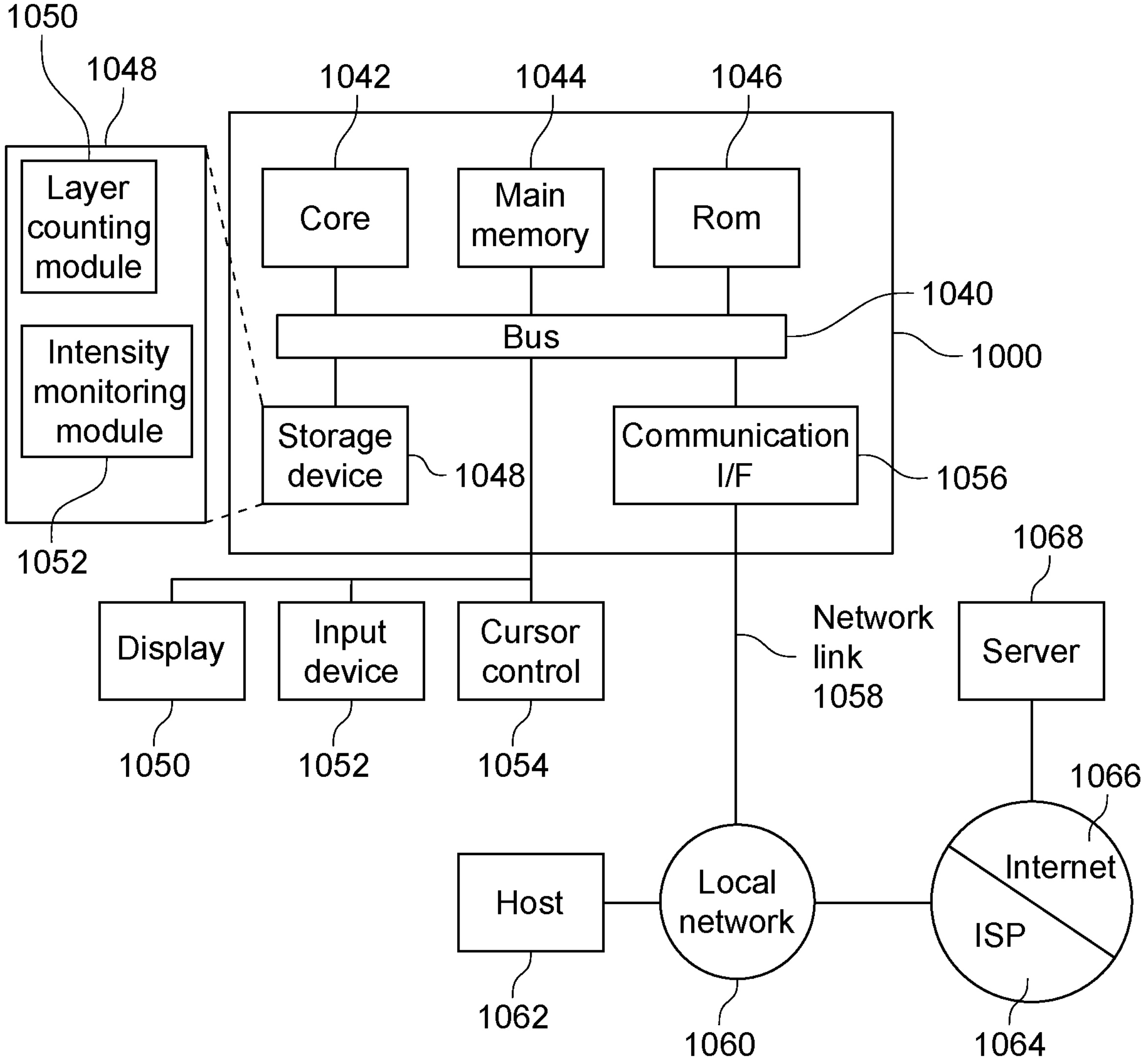
FIG. 12 is a block diagram that illustrates a computer system that an embodiment of the invention may include.

FIG. 12 is a block diagram that illustrates a computer system 1000 that example systems may include and/or that may be configured to execute example methods taught herein. The computing system 1000 may be an example of computing hardware included with system 100. Computer system 1000 at least includes a bus 1040 or other communication mechanism for communicating information, and a hardware processor **1*s*042 coupled with bus 1040 for processing information. Hardware processor 1042 may be, for example, a general-purpose microprocessor. The computing system 1000 may be used to implement the methods and techniques disclosed herein, such as method 1300**, and may also be used to obtain images and segment said images with one or more classes.

Computer system 1000 also includes a main memory 1044, such as a random-access memory (RAM) or other dynamic storage device, coupled to bus 1040 for storing information and instructions to be executed by processor 1042. Main memory 1044 also may be used for storing temporary variables or other intermediate information during execution of instructions to be executed by processor 1042. Such instructions, when stored in non-transitory storage media accessible to processor 1042, render computer system 1000 into a special-purpose machine that is customized to perform the operations specified in the instructions.

Computer system 1000 further includes a read only memory (ROM) 1046 or other static storage device coupled to bus 1040 for storing static information and instructions for processor 1042. A storage device 1048, such as a magnetic disk or optical disk, is provided and coupled to bus 1040 for storing information and instructions.

Computer system 1000 may be coupled via bus 1040 to a display 1050, such as a cathode ray tube (CRT) or flat-screen display, for displaying information to a computer user. An input device 1052, including alphanumeric and other keys, is coupled to bus 1040 for communicating information and command selections to processor 1042. Another type of user input device is cursor control 1054, such as a mouse, a trackball, a touchscreen, or cursor direction keys for communicating direction information and command selections to processor 1042 and for controlling cursor movement on display 1050. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1042 executing one or more sequences of one or more instructions contained in main memory 1044. Such instructions may be read into main memory 1044 from another storage medium, such as storage device 1048. Execution of the sequences of instructions contained in main memory 1044 causes processor 1042 to perform the process steps described herein. In alternative embodiments, hard-wired circuitry may be used in place of or in combination with software instructions.

The term “storage media” as used herein refers to any non-transitory computer-readable medium that store data and/or instructions that cause a machine to operate in a specific fashion. Such storage media may comprise non-volatile media and/or volatile media. Non-volatile media includes, for example, optical or magnetic disks, such as storage device 1048. Volatile media includes dynamic memory, such as main memory 1044. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1040. Transmission media can also take the form of acoustic or light waves, such as those generated during radio-wave and infra-red data communications.

Various forms of media may be involved in carrying one or more sequences of one or more instructions to processor 1042 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1040. Bus 1040 carries the data to main memory 1044, from which processor 1042 retrieves and executes the instructions. The instructions received by main memory 1044 may optionally be stored on storage device 1048 either before or after execution by processor 1042. Although the layer counting module 1050 and intensity monitoring module 1052 are depicted as residing in the storage device 1048, it will be understood that the computer system 1000 can transfer or load these modules or instructions generated by these modules into main memory 1044, ROM, 1046, or other memory for execution by the core 1042.

Computer system 1000 also includes a communication interface 1056 coupled to bus 1040. Communication interface 1056 provides a two-way data communication coupling to a network link 1058 that is connected to a local network 1060. For example, communication interface 1056 may be an integrated services digital network (ISDN) card, cable modem, satellite modem, or a modem to provide a data communication connection to a corresponding type of telephone line. As another example, communication interface 1056 may be a local area network (LAN) card to provide a data communication connection to a compatible LAN. Wireless links may also be implemented. In any such implementation, communication interface 1056 sends and receives electrical, electromagnetic or optical signals that carry digital data streams representing various types of information.

Network link 1058 typically provides data communication through one or more networks to other data devices. For example, network link 1058 may provide a connection through local network 1060 to a host computer 1062 or to data equipment operated by an Internet Service Provider (ISP) 1064. ISP 1064 in turn provides data communication services through the worldwide packet data communication network now commonly referred to as the "Internet" 1066. Local network 1060 and Internet 1066 both use electrical, electromagnetic or optical signals that carry digital data streams. The signals through the various networks and the signals on network link 1058 and through communication interface 1056, which carry the digital data to and from computer system 1000, are example forms of transmission media.

Computer system 1000 can send messages and receive data, including program code, through the network(s), network link 1058 and communication interface 1056. In the Internet example, a server 1068 might transmit a requested code for an application program through Internet 1066, ISP 1064, local network 1060 and communication interface 1056.

The received code may be executed by processor 1042 as it is received, and/or stored in storage device 1048, or other non-volatile storage for later execution.

Figure 13A:
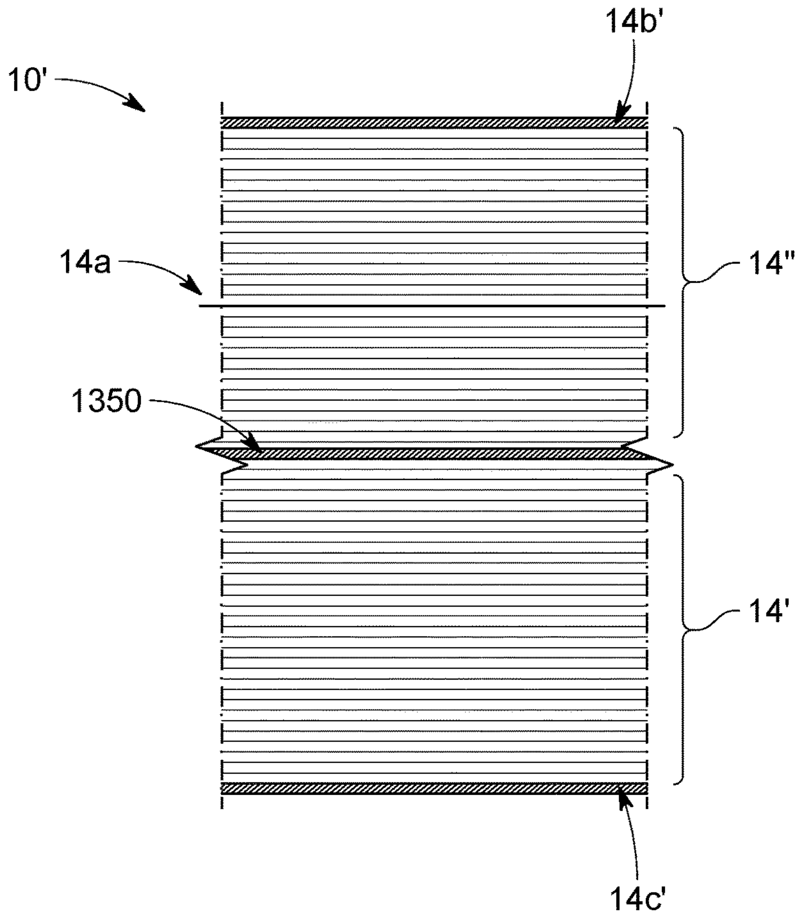
FIG. 13A illustrates a multilayer structure that is appropriate for analysis using the systems and methods taught herein.

FIG. 13A illustrates a multi-layer structure 10' that is appropriate for analysis using the systems and methods taught herein. The multi-layer structure 10' is similar to multi-layer structure 10 depicted in FIG. 1 except that the plurality of alternating layers 14 is organized into distinct stacks 14', 14" of alternating layers separated by one or more junction layers 350. For example, the multi-layer structure 10' can include two stacks of alternating layers, i.e., a first stack 14' of alternating layers and a second stack 14" of alternating layers disposed over the first stack 14'. While two stacks of alternating layers are shown, example multi-layer structures 10' can include three, four, or more stacks of alternating layers separated by junction layers. The multi-layer structure 10' can be formed by depositing the alternating layers of the first stack 14" on, e.g., a silicon or other semiconductive substrate. The junction layer 1350 is then deposited, attached, or formed on the first stack 14'. Then, the second stack 14" is formed by depositing the alternating layers atop the junction layer 1350. In examples of multi-layer structures 10' having junction layers 1350, the top layer **14*b*' is the top-most layer in the stack of alternating layers closest to the top of the multi-layer structure 10' (e.g., the second stack 14") while the bottom layer 14*c*' is the bottom most layer in the stack of alternating layers closest to the bottom of the multi-layer structure 10' (i.e., the first stack 14', which can be closest to the substrate on which the multi-layer structure 10'** was formed).

As would be understood by the skilled person in the art and as used herein, the "junction layer" can also be referred to as a "buffer layer" or as a "The junction layer 1350 can act as a support layer between stacks 14', 14". In some examples, a thickness of at least some portion of the junction layer 1350 can be in a range from 100 nm to 300 nm or in a range from 120 nm to 200 nm. In some examples, the junction layer 1350 is formed of or includes a semiconductive or insulating material such as silicon oxynitride or polysilicon.

Figure 13B:
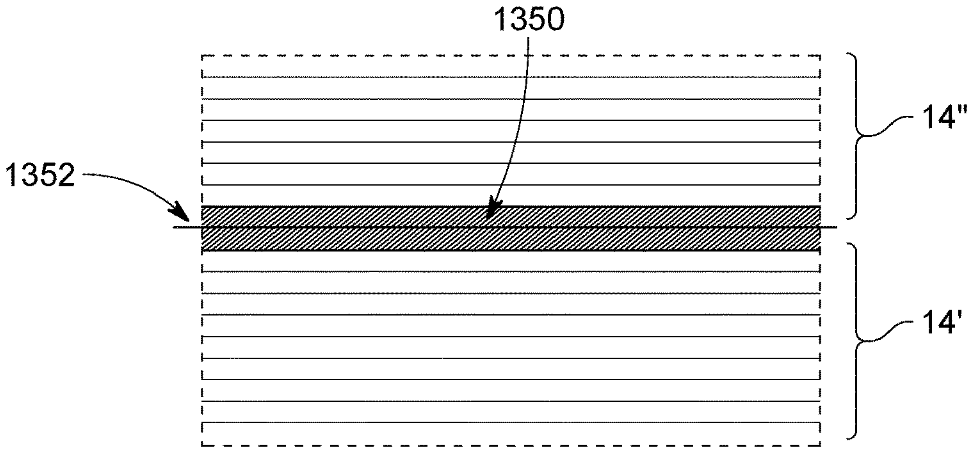
FIG. 13B illustrates an electromicrograph of the multilayer structure of FIG. 13A including a junction layer.

FIG. 13B illustrates an electromicrograph of the multi-layer structure of FIG. 13A including the junction layer 1350. The junction layer 1350 of some examples can be substantially thicker than a layer in the stack of alternating layers (i.e., junction layer 1350 thickness of the order of 5 to 15× thicker for alternating layers with thickness of about 20 nm). As a result of the disparity in thickness between the junction layer 1350 and surrounding layers in the stacks, the junction layer 1350 can be readily discerned in an electromicrograph as seen in FIG. 13B. As described above with respect to FIG. 4, the layer-counting module 1050 can process the electromicrograph to produce a curve. The curve includes a feature corresponding to the junction layer 1350. For example, the curve may include a domain over which the periodicity is different than other domains of the curve, a domain where periodicity is disrupted, or a domain where the intensity differs significantly from other domains of the curve. By detecting wave shape, amplitude, period, and/or by analyzing other features of the curve, the layer-counting module 1050 can isolate the location of a midpoint 1352 corresponding to the junction layer 1350. The term "midpoint" indicates that the junction layer 1350 occurs between the top layer and the bottom layer and is not restricted to the case where the junction layer 1350 lies at the exact midpoint (either by layer count or spatially between top and bottom of the multi-layer structure).

The layer-counting module 1050 can also identify and extract a periodic function (e.g., sine wave) from the curve or a portion thereof (for example, a portion corresponding to layers in the first stack 14' or the second stack 14") as described above with respect to FIG. 4. The layer-counting module 1050 can also extrapolate data to compensate for missing signal as described above. Then, the layer-counting module 1050 can predict the location of the selected layer **14*a* by counting periods of the periodic function from the junction layer 1350. In examples where the first layer 14*b*' or the second layer 14*c*' is visible in the electromicrograph, the position of the selected layer 14*a* of the multi-layer structure 10' (with multiple stacks 14', 14") can be identified by relation to either the first endpoint (corresponding to the top layer 14*b*'), the second endpoint (corresponding to the bottom layer 14*c*'), or the midpoint 1352**.

The embodiments discussed herein to illustrate the disclosed techniques should not be considered limiting and only provide examples of implementation. Those skilled in the art will understand the other myriad ways of how the disclosed techniques may be implemented, which are contemplated herein and are within the bounds of the disclosure.

What is claimed is:

1. A method for preparing a planar lamella, comprising:

obtaining an image of a cross-section of at least a portion of a multi-layer structure including a selected layer and at least one of a top layer, a junction layer, or a bottom layer;

identifying the selected layer within the image using a layer-counting module;

marking the selected layer; and thinning the portion of the multi-layer structure to remove material other than the selected layer.

2. The method of claim 1, further comprising:

preparing the portion of the multi-layer structure by milling to produce a cutface.

3. The method of claim 1, wherein layers of the multi-layer structure include conductive or semi-conductive material layers alternating with insulating material layers.

4. The method of claim 1, wherein identifying the selected layer includes using the layer-counting module to generate a curve based upon pixel intensities within the image.

5. The method of claim 4, wherein generating the curve includes summing pixel intensities in a direction perpendicular to a thickness of the selected layer.

6. The method of claim 4, wherein generating the curve includes averaging pixel intensities in a direction perpendicular to a thickness of the selected layer.

7. The method of claim 4, wherein identifying the selected layer includes applying a regression or function decomposition analysis to extract a periodic function from at least a portion of the curve.

8. The method of claim 7, wherein identifying the selected layer further includes counting periods of the periodic function from a first endpoint associated with the top layer, from a midpoint associated with the junction layer, or from a second endpoint associated with the bottom layer.

9. The method of claim 7, wherein identifying the selected layer further includes using the periodic function to extrapolate a distance from a first endpoint associated with the top layer, from a midpoint associated with the junction layer, or from a second endpoint associated with the bottom layer.

10. The method of claim 1, further comprising employing a rotation operation on the image or the portion of multi-layer structure to align layers in the image with an imaging device.

11. The method of claim 1, wherein marking the selected layer includes milling marks into a cutface of the multi-layer structure.

12. A system for preparing a planar lamella, the system comprising:

a scanning electron microscope (SEM) system;

a focused ion beam (FIB) system; and a computer system including a processor and a memory that is configured to control the SEM system and the FIB system, the memory including a layer-counting module, the memory storing computer-executable instructions that cause the computer to:

obtain, using the SEM system, an image of a cross-section of a portion of a multi-layer structure including a selected layer and at least one of a top layer, a junction layer, or a bottom layer;

identify the selected layer within the image using the layer-counting module;

mark, using the FIB system, the selected layer; and thin the portion of the multi-layer structure using the FIB system to remove material other than the selected layer.

13. The system of claim 12, wherein the computer-executable instructions further cause the computer to prepare the portion of the multi-layer structure using the FIB system to mill the multi-layer structure to produce a cutface.

14. The system of claim 12, wherein the computer-executable instructions to identify the selected layer include instructions to use the layer-counting module to generate a curve based upon pixel intensities within the image.

15. The system of claim 14, wherein the computer-executable instructions to use the layer-counting module to generate the curve include instructions to sum pixel intensities in a direction perpendicular to a thickness of the selected layer.

16. The system of claim 14, wherein the computer-executable instructions to use the layer-counting module to generate the curve include instructions to average pixel intensities in a direction perpendicular to a thickness of the selected layer.

17. The system of claim 14, wherein the computer-executable instructions to identify the selected layer include instructions to apply a regression or function decomposition analysis to extract a periodic function from at least a portion of the curve.

18. The system of claim 17, wherein the computer-executable instructions to identify the selected layer include instructions to count periods of the periodic function from a first endpoint associated with the top layer, from a midpoint associated with the junction layer, or from a second endpoint associated with the bottom layer.

19. The system of claim 17, wherein the computer-executable instructions to identify the selected layer include instructions to use the periodic function to extrapolate a distance from a first endpoint associated with the top layer, from a midpoint associated with the junction layer, or from a second endpoint associated with the bottom layer.

20. A non-transitory computer-readable medium including computer executable instructions that, when executed by a computer system, cause the computer system and associated dual beam system to:

obtain an image of a cross-section of at least a portion of a multi-layer structure including a selected layer and at least one of a top layer, a junction layer, or a bottom layer;

identify the selected layer within the image using a layer-counting module;

mark the selected layer; and thin the portion of the multi-layer structure to remove material other than the selected layer.

* * * * *